(12) United States Patent
Frauhammer et al.

(10) Patent No.: US 7,258,349 B2
(45) Date of Patent: Aug. 21, 2007

(54) HAND POWER TOOL

(75) Inventors: Karl Frauhammer, Leinfelden-Echterdingen (DE); Heinz Schnerring, Dettenhausen (DE); Willy Braun, Neustetten (DE); Axel Kuhnle, Freiberg A. N. (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 10/843,054

(22) Filed: May 11, 2004

(65) Prior Publication Data

US 2004/0245731 A1 Dec. 9, 2004

(30) Foreign Application Priority Data

May 15, 2003 (DE) ................. 103 21 869

(51) Int. Cl.
*B23B 31/107* (2006.01)

(52) U.S. Cl. .............. 279/19; 279/19.3; 279/19.6; 279/66; 279/78

(58) Field of Classification Search ......... 279/19, 279/19.3, 19.6, 19.4, 19.5; 408/238, 239 R, 408/240
See application file for complete search history.

(56) References Cited

U.S. PATENT DOCUMENTS

| 4,107,949 | A |  | 8/1978 | Wanner et al. |
| 4,174,113 | A | * | 11/1979 | Eckman .............. 279/19.4 |
| 4,284,148 | A |  | 8/1981 | Wanner et al. |
| 4,824,298 | A | * | 4/1989 | Lippacher et al. ......... 408/240 |
| 5,199,833 | A | * | 4/1993 | Fehrle et al. ........... 408/239 R |
| 5,437,465 | A | * | 8/1995 | Vogele et al. ............. 279/22 |
| 5,603,516 | A | * | 2/1997 | Neumaier .............. 279/19.5 |
| 6,092,814 | A | * | 7/2000 | Kageler .............. 279/19.4 |
| 6,179,300 | B1 | * | 1/2001 | Baumann et al. ......... 279/19.4 |
| 6,241,026 | B1 | * | 6/2001 | Wache et al. ............ 173/132 |
| 6,536,780 | B2 | * | 3/2003 | Baumann et al. ......... 279/19.4 |
| 6,536,782 | B2 | * | 3/2003 | Rohm .................. 279/62 |
| 6,691,799 | B2 | * | 2/2004 | Kuhnle et al. ............ 173/132 |
| 6,820,700 | B2 | * | 11/2004 | Funfer et al. ............ 173/132 |
| 2002/0179310 | A1 | * | 12/2002 | Kuhnlee et al. .......... 173/114 |
| 2003/0188877 | A1 | * | 10/2003 | Sauer et al. ............. 173/13 |
| 2005/0093251 | A1 | * | 5/2005 | Buchholz et al. ......... 279/19 |
| 2005/0161242 | A1 | * | 7/2005 | Frauhammer ............ 173/29 |
| 2005/0284648 | A1 | * | 12/2005 | Frauhammer et al. ...... 173/176 |

FOREIGN PATENT DOCUMENTS

| DE | 25 51 125 | 5/1977 |
| DE | 28 20 128 | 11/1979 |

(Continued)

*Primary Examiner*—Monica Carter
*Assistant Examiner*—Michael W. Talbot
(74) *Attorney, Agent, or Firm*—Michael J. Striker

(57) ABSTRACT

A hand power tool selected from the group consisting of a drill hammer and an impact hammer has an exchangeable tool holder, a guide pipe which receives the tool holder at its free end, a locking device arranged on the guide pipe and operative manually for fixing the tool holder on the guide pipe in a defined locking position assumed by the tool holder on the guide pipe, so that the locking position is arranged before a mounting position in a displacement direction of the tool holder, in which mounting position the tool holder is held unlocked on the guide pipe, the locking device being provided with means activatable by a release of the locking device and providing a displacement of the tool holder to the mounting position.

14 Claims, 1 Drawing Sheet

FOREIGN PATENT DOCUMENTS

| | | |
|---|---|---|
| DE | 32 05 063 A1 | 10/1982 |
| EP | 1293289 A1 * | 3/2003 |
| EP | 1477281 A2 * | 11/2004 |
| GB | 2 096 046 A | 10/1982 |
| GB | 3828309 A1 * | 2/1990 |
| GB | 2313566 A * | 12/1997 |
| WO | WO 02/24403 A1 * | 3/2002 |

* cited by examiner

HAND POWER TOOL

CROSS-REFERENCE

The invention described and claimed hereinbelow is also described in DE 103 21 869.6, filed May 15, 2003. This German Patent Application, whose subject matter is incorporated here by reference, provides the basis for a claim of priority of invention under 35 U.S.C. 119 (a)-(d).

BACKGROUND OF THE INVENTION

The present invention relates to a hand power tool, in particular a hammer drill or an impact hammer.

In a known hand power tool disclosed for example in the German patent document DE 28 20 128 A1 the tool holder is connected of one piece with a rotary sleeve which is supported rotatably on a guide pipe and can be rotated by means of a rotary drive. The guide pipe is arranged fixedly on the machine housing and receives a drive piston of a so-called impact mechanism which is reciprocatingly axially movable by a wobble drive, and an axially displaceable impact piston or anvil. Between the drive piston and the anvil, an air cushion is provided. When the impact mechanism is turned on, the drive piston strikes through the air cushion on the anvil, and it gives an impact energy directly to the tool which is clamped axially displaceably and non rotatably in the tool holder. If in addition the rotary drive is turned on, the tool holder is rotated and the tool is rotated through it.

A known exchangeable tool holder for a hand power tool, in particular for a drill hammer and/or impact hammer as disclosed in the German patent document DE 32 05 063 C2 is fixed to be displaceable to a limited degree and to be non rotatable, by a locking device directly on the drive spindle which performs a rotary and a stroke movement. For this purpose the tool holder has an end region which is fittable on the drive spindle and is in a rotary connection with the drive spindle through a spline profile. In this end region at least one radial opening is provided, in which a ball is arranged radially displaceably as a locking body. The ball engages in a circumferential longitudinal groove formed in the drive spindle and locks the tool holder with an axial clearance from pulling out in an axial direction. A displacement sleeve which serves for clamping the tool in the tool holder engages the ball and blocks its radial displacement. When the displacement sleeve is manually displaced by force toward the front end, the at least one ball is released and the tool holder can be pulled from the guide pipe by displaceably held displacement sleeve.

In a known hand power tool with a rotatable guide pipe supported in the machine housing and an exchangeable tool holder arranged on the guide pipe in its end region extending outwardly beyond the machine housing (hammer drill Type No. 0611 249 700), the end portion of the tool holder which engages the guide pipe has four radial openings which are spaced from one another by a rotary angle of 90°, and a ball representing a locking body is radially displaceably inserted in the corresponding radial opening and secured from falling out of the radial opening. In the locking position of the tool holder the balls are located in troughs which are offset by the same rotary angle in the guiding pipe. A rotatably movably held displacement sleeve engages the balls with a radially inwardly projecting ring web and thereby prevents any radial displacement of the ball. When the displacement sleeve is manually placed rearwardly by a rotary-/displacement movement in direction of the machine housing, the ring web releases the balls and the tool holder can be removed from the guide pipe with the displaceably held displacement sleeve.

SUMMARY OF THE INVENTION

Accordingly, it is an object of the present invention to provide a hand power tool of the above mentioned general type, which is a further improvement of the existing hand power tools.

In keeping with these objects and with others which will become apparent hereinafter, one feature of the present invention resides, briefly stated, in a hand power tool selected from the group consisting of a drill hammer and an impact hammer, comprising an exchangeable tool holder; a guide pipe which receives said tool holder at its free end; a locking device arranged on said guide pipe and operative manually for fixing said tool holder on said guide pipe in a defined locking position assumed by said tool holder on said guide pipe, so that the locking position is arranged before a mounting position in a displacement direction of said tool holder, in which mounting position said tool holder is held unlocked on said guide pipe, said locking device being provided with means activatable by a release of said locking device and providing a displacement of said tool holder to said mounting position.

When the hand power tool is designed in accordance with the present invention as defined in claim 1, it has the advantage that the exchange, or in other words the mounting and dismounting of the tool holder identified also as an exchange chuck, can be possible with one hand operation. The operator holds the power tool with the guiding hand, and with the other hand can remove the tool holder from the power tool or place it on the power tool. The placement is performed by a simple fitting of the tool holder onto the guiding pipe, wherein at reaching the locking position, the locking device is automatically activated and fixes the tool holder non rotatably and axially displaceably on the guide pipe.

For removing of the tool holder from the power tool, the locking device must be first released with one hand, whereby the tool holder is displaced automatically to the unlocked mounting position of the guide pipe, in which it is secured on the guide pipe from falling out. The operator can release the displacement sleeve and with the same hand can remove the tool holder by manual gripping or again lock it, depending on the direction in which the tool holder is displaced. A new release of the locking device or a holding of the locking device in its deactivating position is not needed.

When the operator neither pulls out nor again locks the tool holder located in the mounting position, its failure is prevented, since with placing the tool clamped in the tool holder at the operational location, the tool holder under the action of the pressing force applied to the tool is displaced from the mounting position to the locking position and is automatically locked by the locking device.

The axial operating direction of the tool holder and the locking device during exchange of the tool holder is ergonomically optimal. The unlocking of the tool holder by a displacement movement in direction of the operator is understandable and facilitates the handling. Moreover, with the removed tool holder, the components of the locking device are easily mountable on the guide pipe, and in the case of a repair or recycling they are easily dismountable.

In accordance with a preferable embodiment of the present invention, the tool holder in its region engaging the guide pipe is provided with locking bodies which are offset relative to one another in a peripheral direction, are radially limitedly displaceable, and are held axially non displaceably. The same number of pockets which axially non displaceably receive the locking bodies are provided on the guiding pipe in the locking position of the tool holder, and in the mounting position the same number of concavities each receiving a corresponding locking body are provided. The concavities are adapted to the limited radial displacement of the locking bodies so that the latter are introduced into the concavities with a low but sufficient radial pressing force, so that falling out of the tool holder is reliably prevented. Basically it suffices to provide only one locking body and correspondingly only one pocket and a preceding concavity.

The displacement means for bringing the tool holder from the locking position to the mounting position with release of the locking device include, in accordance with a preferable embodiment, a pre-tensioned spring which is supported on the one hand against the tool holder and on the other hand against the guide pipe.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
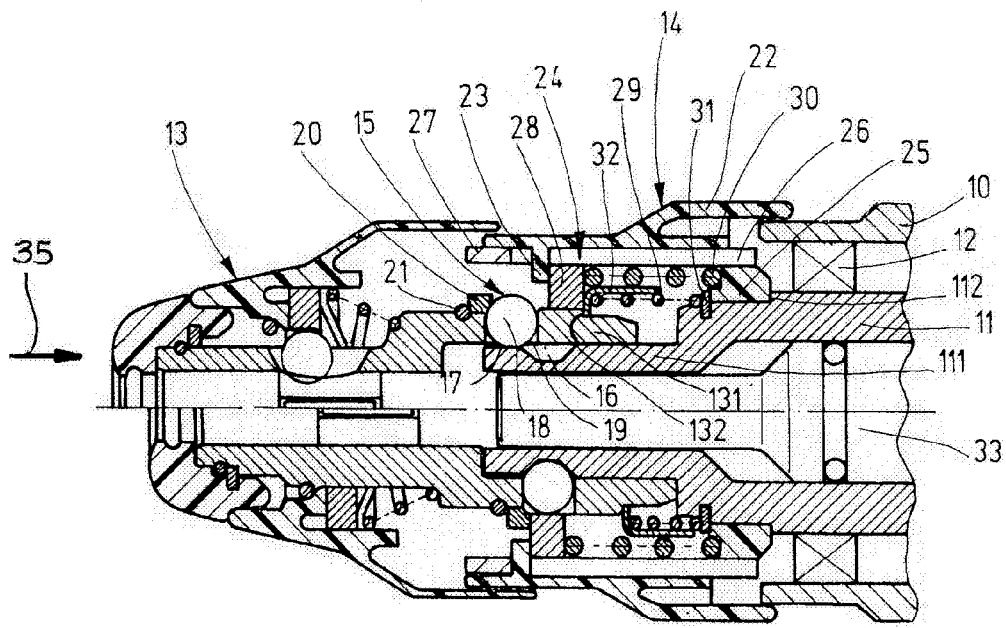
FIG. 1 is a view showing a portion of the hammer drill with a tool holder in a section in accordance with a first embodiment of the present invention, wherein the tool holder in an upper half of the drawing is shown in its mounting position and in a lower half of the drawing is shown in its locking position.

FIG. 1 shows a longitudinal section of a part of a hammer drill as an example for generally a hand power tool. It has a machine housing 10, and a guide pipe 11 which is arranged in the machine housing rotatably by means of a radial bearing 12. The guide pipe 11 has a front end region 111 which extends outwardly beyond the machine housing 10 and has a reduced diameter for receiving a tool holder 13. The tool holder 13 is known and can be formed for example for receiving a so-called SDS plus tool. Such a tool and a tool holder for clamping the tool are described for example in the German patent document DE 25 51 125 C2, so that their details should not be explained in detail.

An impact piston or an anvil of a not shown impact mechanism is axially displaceably guided in the guide pipe 11. It is formed so as to be stricken by a reciprocating drive piston and its impact energy is transmitted to the tool which is clamped in the tool holder 13 so that it is limitedly axially displaceable. A rotary drive engages also with the guide pipe 11 and can turn the guide pipe 11 in rotation. An example for a rotary drive and an impact mechanism is provided for example in the German patent document DE 28 20 128 A1.

The tool holder 13 is arranged exchangeably on the guide pipe 11. By means of a locking device 14 it is fixed in its locking position on the guide pipe 11 axially substantially non displaceably and non rotatably relative to it. The locking position of the tool holder 13 is shown in the lower half of FIG. 1. The tool holder 13 in the case of wear or exchange of a tool holder, for example for an SDS plus tool, can be replaced with another tool holder, for example for a normal drill.

In order to provide the exchange of the tool holder 13 ergonomically, and in particular by one hand operation during the exchange process, a mounting position for the tool holder 13 is provided on the guide pipe 11. In the mounting position the tool holder 13 is arranged unlocked on the guide pipe 11 and is held against falling out. In this mounting position, with release of the locking device 14, the tool holder 13 is automatically brought to this mounting position by a displacement means which becomes operative. For this purpose the tool holder 13, in its end portion 131 which engages the end portion 111 of the guide pipe 11 and has an increased diameter, is provided with at least one locking body 15. In the end region 111 of the guide pipe at least one pocket 16 is provided, in which the locking body 15 in the locking position of the tool holder 13 lowers and thereby a non rotatable and axially displaceable connection between the guide pipe 11 and the tool holder 13 is provided. For the mounting position of the tool holder 13, at least one concavity 17 is formed in the guide pipe 11, and the locking body 15 can be moved into it by a small radial pressing force. The concavity 17 is supported axially directly before the pocket 16 as considered in the pushing, or displacement, direction 35 of the tool holder 13 of the guide pipe 11. In accordance with a preferable embodiment of the present invention, several, for example four locking bodies 15, pockets 16 and concavities 17 are provided, and are offset relative to one another over the same rotary angle. The locking bodies 15 are axially non displaceably received in wall passages of the end portion 131 of the tool holder 13 and secured against radial falling out outwardly.

In the above described embodiment, the locking bodies 15 are formed as balls, and the pocket 16 are formed as radial openings. The radial falling out of the balls 18 from the radial openings 19 is prevented by a ring disc 20. The ring disc 20 is fixed on the end portion 131 of the tool holder 13 by a safety ring 21. The ring disc 20 abuts against the balls 18 so that they are arranged in the radial openings 19 with a certain radial clearance. The concavities 17 have a contour corresponding to the contour of the balls 18, and in the mounting position the balls 18 are located in the concavities 17 with a little pre-stress by the ring disc 20.

The locking device 14 is fixed on the guide pipe 11 and has for example a displacement sleeve 22 which carries a radially inwardly projecting ring web 23. The displacement sleeve 22 is axially displaceably guided on a guide element 24 which is mounted on the guide pipe 11. The displacement sleeve 22 engages the machine housing 10 with its end which faces the machine housing. The guide element 24 is formed as a one-piece synthetic plastic injected part. It has a ring 25 which is fixed axially non displaceably on the guide pipe 11, and a plurality of arms 26 extend axially from the ring 25 and have arresting hooks 27 projecting at their free ends in a peripheral direction. The arresting hooks 27 form a front abutment for the displacement of the displacement sleeve 22.

The ring web 23 of the displacement sleeve 22 radially engages a blocking ring 28 of the locking device 14 which is axially displaceably guided by the arms 26 of the guide element 24. A helical spring 30 is supported between the blocking ring 28 and the ring 25 of the guiding element 24. It abuts the locking ring 28 against the ring web 23 of the displacement sleeve 22, so that the ring web 23 is pressed against the arresting hooks 27. In this locking position of the locking device 14, the blocking ring 28 is located on the locking bodies 15 or the balls 18, which are introduced in the pockets 16 and prevent any radial displacement of the locking bodies 15 or the balls 18.

Displacement means are integrated in the locking device 14. They are automatically activated with a release of the locking device 14 and displace the tool holder 13 to the mounting position, in which the locking bodies 15 or the balls 18 are engaged in the concavities 17. In the embodiment of FIG. 1, this means include a cylindrical pressure spring 29 which is supported against the locking ring 28 and the guide pipe 11. One embodiment of the pressure spring 19 against the guide pipe 11 is provided by safety disc 31 which is inserted in the ring groove formed in the guide pipe 11 and clamps the ring 25 of the guiding element 24 against a radial shoulder formed in the guide pipe 11. The other abutment of the pressure spring 29 is formed by a cup bottom of a spring cup 32 which engages with a central opening of the end portion 131 of the tool holder 13 and abuts against a radial shoulder 132 formed at the end portion 131.

The mounting and dismounting of the tool holder 13 is performed in the following manner:

For mounting, the tool holder 13 with its end portion 131 is placed on the end region 111 of the guide pipe 11 until the balls 18 are located in the mounting position of the tool holder 13 in the concavities 17. During a further displacement in direction toward the machine housing 10, the balls 18 abut against the blocking ring 28 which is displaced back so far until the balls 18 in the locking position of the tool holder 13 engage in the pockets 16. In this moment the blocking ring 28 is displaced again by the helical spring 30 forwardly for abutment against the ring web 23 of the displacement sleeve 22. In this locking position the blocking ring 28 is placed on the balls 18 and blocks their radial displacement, so that the balls 18 can not move from the pockets 16 and the locking between the guide pipe 11 and the tool holder 13 is reliably maintained (lower part of FIG. 1). The locking during the mounting is therefore automatically performed by simple, one hand displacement of the tool holder 13 on the guide pipe 11. The power tool can be held with another hand.

For dismounting, the displacement sleeve 22 is displaced in direction of the machine housing 10 rearwardly. The ring web 23 on the displacement sleeve 22 moves the blocking ring 28 as shown in the upper half of FIG. 1. By the displacement of the blocking ring 28, on the one hand the balls 18 are released and on the other hand the pressure spring 29 and the helical pressure spring 30 are tensioned. When now the displacement sleeve 22 is released, the pressure spring 29 displaces the tool holder 13 to the left in FIG. 1, while the balls 18 are moved from the pockets 16 as a result of the radial displaceability and fall in the concavities 17 in the mounting position. The pressure spring 29 is designed so that the balls 18 are not displaced by the spring force from the concavities 17.

The relaxed helical pressure spring 30 presses the blocking ring 28 and the displacement sleeve 22 until abutment of the ring web 23 against the displacement sleeve 22 against the arresting hooks 27 of the guiding element 24. The tool holder 13 is now unlocked for removal from the guide pipe 11. When the operator displaces the tool holder 13 to the right in FIG. 1, the tool holder 13 is automatically locked again as explained herein above. When the operator pulls the tool holder 13 to the left in FIG. 1, the tool holder 13 is removed from the guide pipe 11. The actuation of the displacement sleeve 22 and the pulling out off of the tool holder 13 from the mounting position is performed one after the other with the same hand, while the other hand holds the machine. The dismounting of the tool holder 13 can therefore be performed with the one hand.

Figure 2:
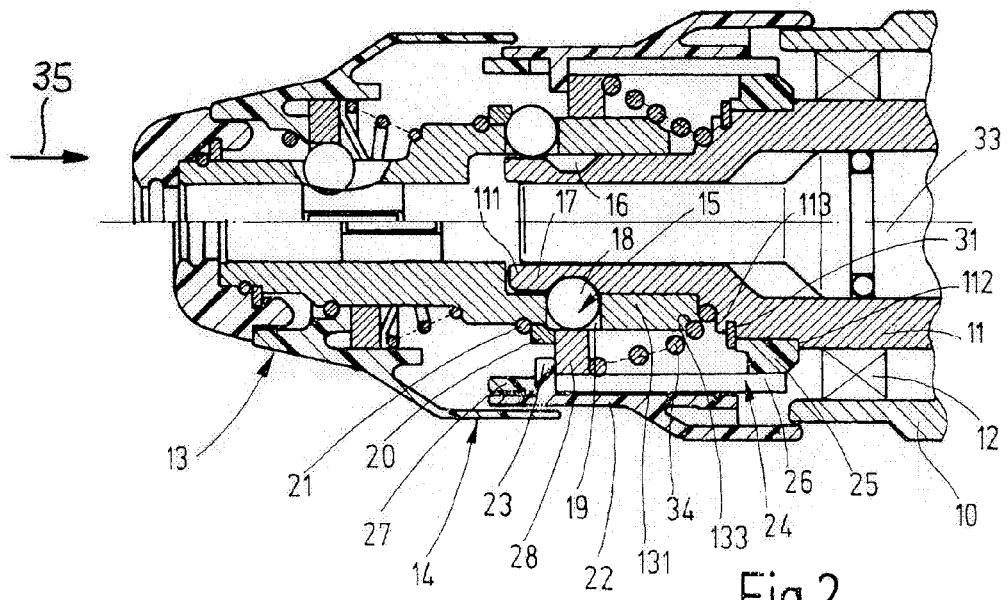
FIG. 2 is a view showing a hammer drill in accordance with a second embodiment of the present invention, with a tool holder in a section in accordance with a first embodiment of the present invention, wherein the tool holder in an upper half of the drawing is shown in its mounting position and in a lower half of the drawing is shown in its locking position.

In the embodiment of the hammer drill with the tool holder 13 as shown in FIG. 2, the locking device 14 is different in that the separate function of the both pressure springs 29 and 30 in the locking device 14 of FIG. 1 is performed by a single conical spring 34. The end portion 131 of the tool holder 13 which engages the lateral end of the end region 111 of the guide pipe 11 is provided with a cone 133. The conical spring 34 has a diameter-increased spring end which is located on the blocking ring 28 and a diameter reduced end which is located on a further radial shoulder 113 formed in the guide pipe 11. The cone 133 and the conical spring 34 are formed with respect to one another so that in the locking position of the tool holder 13 shown in the lower half of FIG. 2 the conical spring 34 is pretensioned by the cone 133 to bulge outwardly.

When the displacement sleeve 22 is pulled back for releasing the locking device 14, the conical spring 34 is released from the cone 133 as shown in the upper half of FIG. 2. During release of the rearwardly pulled displacement sleeve 22, the conical spring 34 is loosened and displaces not only the blocking ring 28 and the displacement sleeve 22 for abutment against the arresting hooks 27 of the guiding element 24, but the windings of the conical spring 34 also touch the cone 133 and displace the tool holder 13 forwardly to its lock-free mounting position, in which the locking bodies 15 or the balls 18 are introduced into the concavities 17 on the end region 111 of the guide pipe 11. In other aspects the construction and the operation of the locking device 14 for a tool exchange are identical to that in FIG. 1, so that the same components are identified with the same reference numerals and the description of the embodiment of FIG. 1 is applicable to the description of FIG. 2. The tool holder 13 in the upper half of FIG. 2 is shown in its unlocked mounting position and in the lower half of FIG. 2 is shown in its locking position.

It will be understood that each of the elements described above, or two or more together, may also find a useful application in other types of constructions differing from the types described above.

While the invention has been illustrated and described as embodied in hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A hand power tool selected from the group consisting of a drill hammer and an impact hammer, comprising an exchangeable tool holder; a guide pipe which receives said tool holder at its free end; a locking device arranged on said guide pipe and operative manually for fixing said tool holder on said guide pipe in a defined locking position assumed by said tool holder on said guide pipe, so that a mounting position is arranged before the locking position in a push direction of said tool holder onto the guide pipe, wherein in said mounting position, said tool holder is held unlocked on said guide pipe, said locking device being provided with displacement means activatable by a release of said locking device and providing a displacement of said tool holder to said mounting position, wherein said tool holder in its end portion in which it engages said guide pipe has at least one radially displaceable and axially non-displaceable locking body, while said guide pipe in the locking position of said tool holder has at least one pocket which axially non displaceably receives said locking body, and also in the mounting position of said tool holder has at least one concavity which receives said locking body and is located axially before said pocket.

2. A hand power tool as defined in claim 1, wherein said at least one locking body is received in a passage provided in an end portion of said tool holder and secured from exiting from said passage.

3. A hand power tool as defined in claim 2, wherein said at least one locking body is formed as a ball, while said at least one passage in the end portion of said tool holder is formed as a radial opening, and said ball is fixed in said radial opening by a ring disc fixed on said tool holder with an axial clearance.

4. A hand power tool as defined in claim 1, wherein said displacement means include a spring which is pre-stressed in the locking position and abuts with one end against said tool holder and with another end against said guide pipe.

5. A hand power tool as defined in claim 1, wherein said locking device has a locking ring which in the locking position blocks a radial displacement of said at least one locking body and has a manually actuatable displacement sleeve which is coupled with said locking ring.

6. A hand power tool as defined in claim 5;
and further comprising a machine housing, said guide pipe being received in said machine housing and extending at an end side outwardly beyond said machine housing, while said displacement sleeve engages a free end of said machine housing.

7. A hand power tool as defined in claim 6, wherein said guide pipe is supported in said machine housing rotatably.

8. A hand power tool as defined in claim 5, wherein said displacement sleeve has a ring web which engages said locking ring, said ring web in condition when said displacement sleeve is not actuated abuts against an axial abutment under action of a spring force acting on said locking ring, and during displacement of said displacement sleeve drives said locking ring against the spring force.

9. A hand power tool as defined in claim 8, wherein said tool holder has a free end facing towards said guide pipe and provided with a cone; and further comprising a conical spring which engages said tool holder and has a diameter increased spring end abutting against said ring web of said displacement sleeve and a diameter reduced spring end abutting against said guide pipe, said cone and a shape of said conical spring being selected with respect to one another so that in the locking position said conical spring is pre-stressed by said cone outwardly in a bulged manner.

10. A hand power tool as defined in claim 8, wherein said axial abutment is formed on a guiding element which guides said displacement sleeve and is mounted on said guide pipe.

11. A hand power tool as defined in claim 10, wherein said guiding element has a ring which is fixed axially non displaceably on said guide pipe and a plurality of arms axially extending from said ring and having free ends provided with arresting hooks which form an abutment for said ring web of said displacement sleeve.

12. A hand power tool as defined in claim 11, wherein said guiding element is formed as a synthetic plastic injection molded part.

13. A hand power tool as defined in claim 11; and further comprising a spring which engages said tool holder and is formed as a cylindrical pressure spring, said spring abutting against a safety disc which is held on said guide pipe and also on a bottom of a spring cup provided with a central opening and abutting against a radial shoulder formed on the tool holder; and a helical pressure spring providing a spring force acting on said locking ring and abutting against said ring of said guiding element and against said locking ring.

14. A hand power tool as defined in claim 1, wherein said end portion of said tool holder is provided with a plurality of said locking bodies and said passages which are offset relative to one another by a rotary angle while said end region of said guide pipe is provided with a same number of said pockets and also said concavities located axially before said pockets, which are also spaced from one another by said same rotary angle.

* * * * *